A. FAY.
APPARATUS FOR OPERATING UPON COMPOSITE SUBSTANCES.
APPLICATION FILED JAN. 3, 1916.

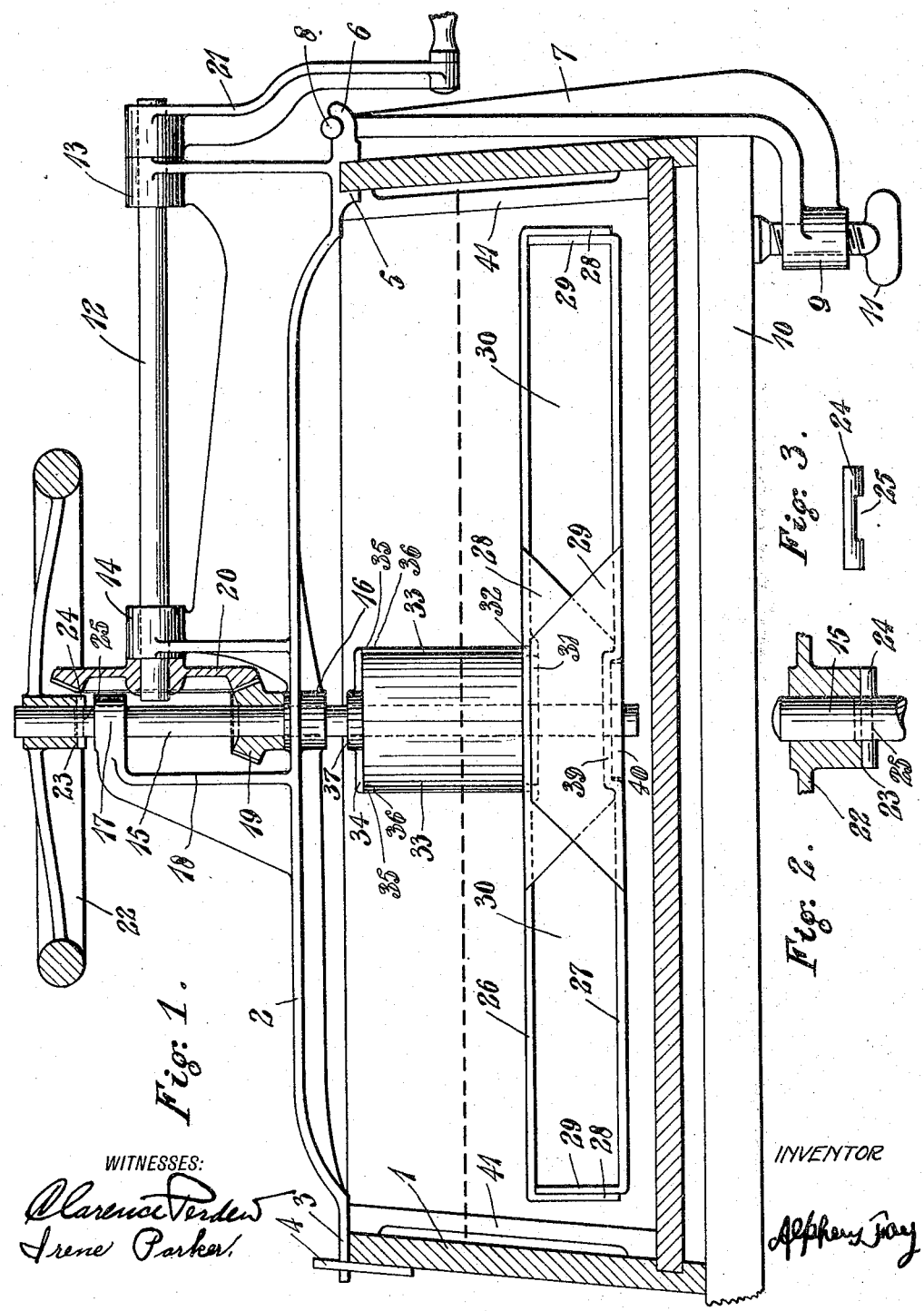

1,191,883.

Patented July 18, 1916.
4 SHEETS—SHEET 3.

WITNESSES:
Clarence Porden
Irene Parker.

INVENTOR
Alpheus Fay

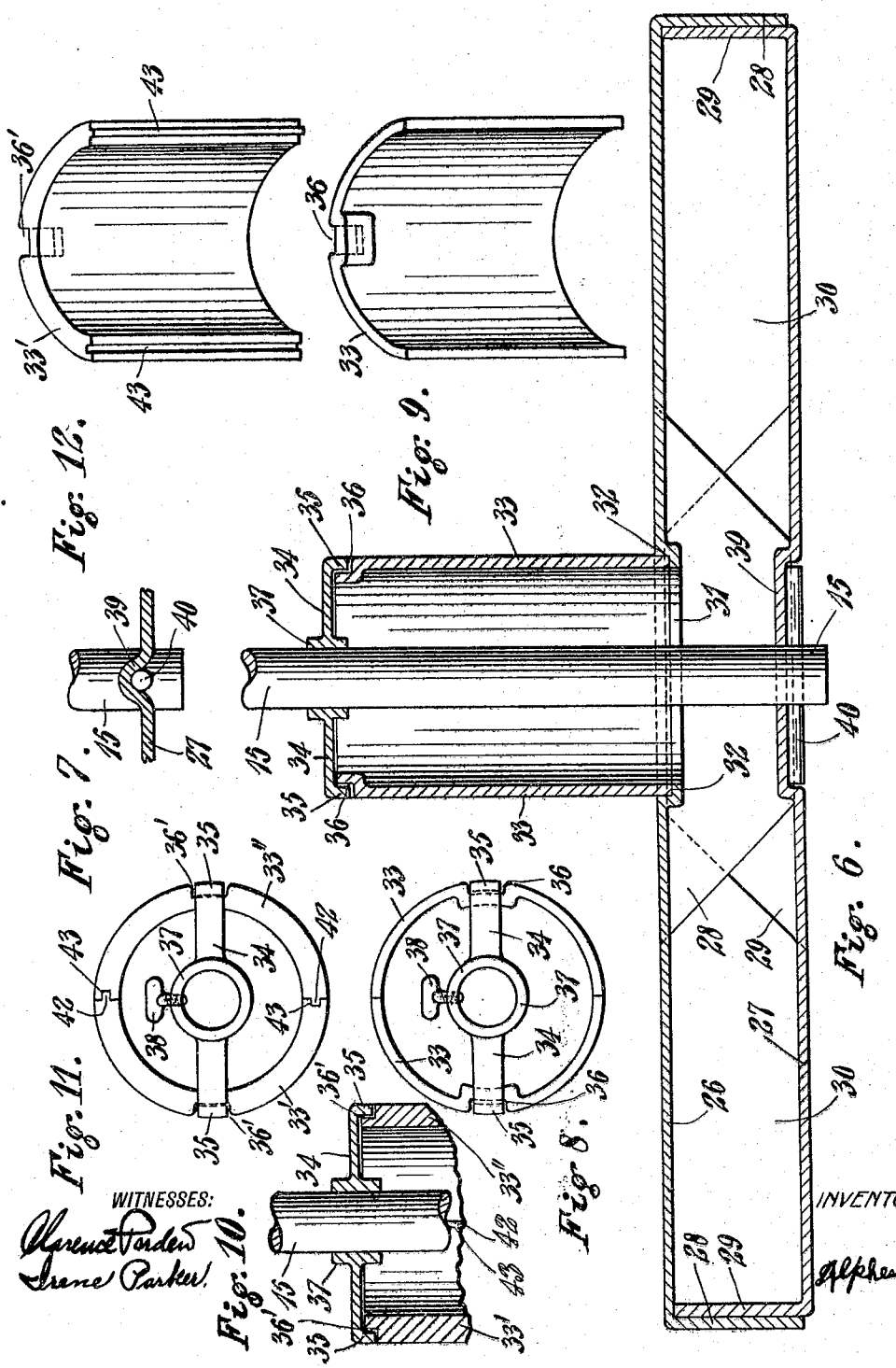

UNITED STATES PATENT OFFICE.

ALPHEUS FAY, OF LOUISVILLE, KENTUCKY.

APPARATUS FOR OPERATING UPON COMPOSITE SUBSTANCES.

1,191,883.  Specification of Letters Patent.  Patented July 18, 1916.

Application filed January 3, 1916. Serial No. 69,886.

*To all whom it may concern:*

Be it known that I, ALPHEUS FAY, a citizen of the United States, and a resident of Louisville, in the county of Jefferson and State of Kentucky, have invented a certain new and useful Apparatus for Operating upon Composite Substances, of which the following is a specification.

The object of my invention is to provide a novel method and means to operate upon a comparatively broad shallow body of a composite substance containing butter fat, with the vertical pressure, peripheral pressure and the peripheral surface of said body minimized; and the upper surface, the lower surface and the peripheral diameter of said body maximized to allow said body to partake freely of undulatory movement by rotatable members with their thickness and their peripheral surfaces minimized and their upper surfaces and lower surfaces and diameter maximized; with the peripheries of said members moving in close proximity with the inside walls of said vessel, the distance from the center to the periphery of said members being greater than the distance from the peripheries of the said members to the inside walls of said vessel; said members rotating said body in the same direction as said members but at a slow velocity compared with the velocity of said members, said vessel having its walls converged with a broad width and a shallow depth to allow the substance in the vessel to rise and fall freely to be acted upon to produce mechanical and chemical changes in the substance without interference with the walls of said vessel.

A further object of my invention is to simplify the construction of apparatus of the above character, thereby making it more economical of production; and also to make the apparatus readily disassembled for storage or shipping; and to make each part so that when it is detached from the other parts it will very readily be cleaned, so that the entire apparatus may be kept thoroughly sanitary in use.

My invention consists in the combination of parts and in the details of construction and in the method as will herein be more fully described and claimed.

Figure 4:
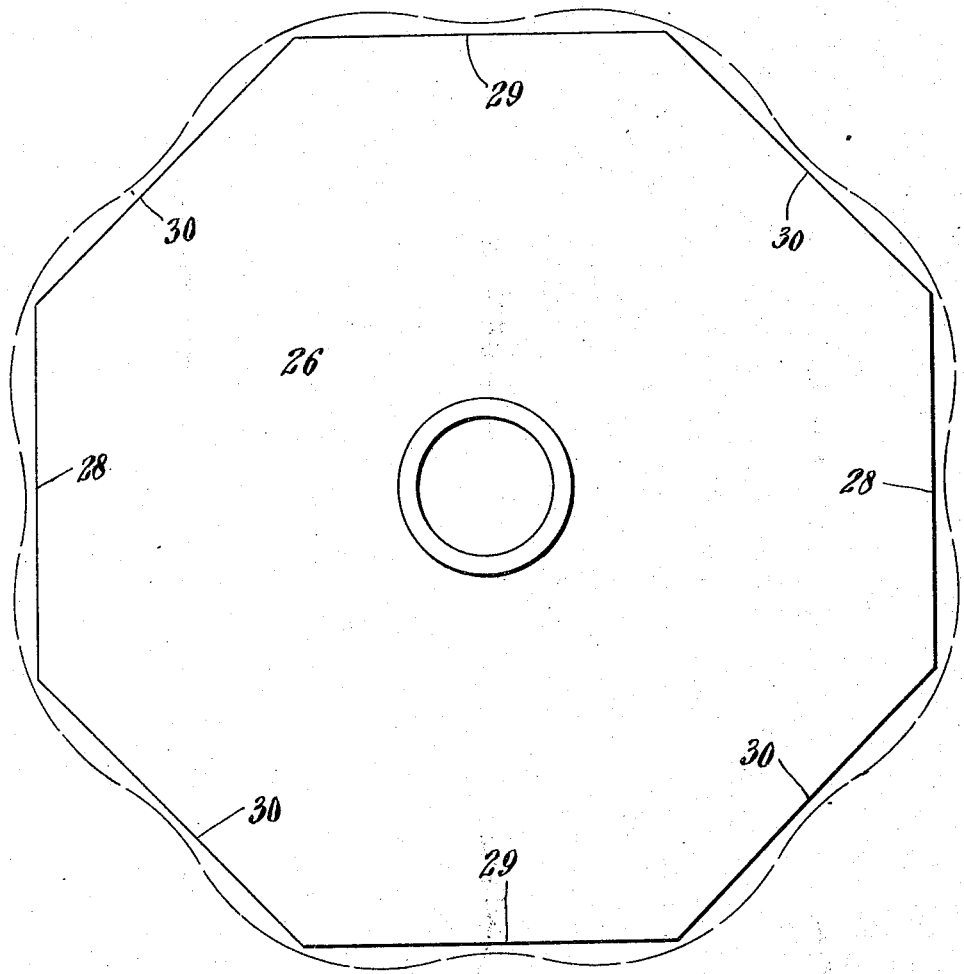
Figure 5:
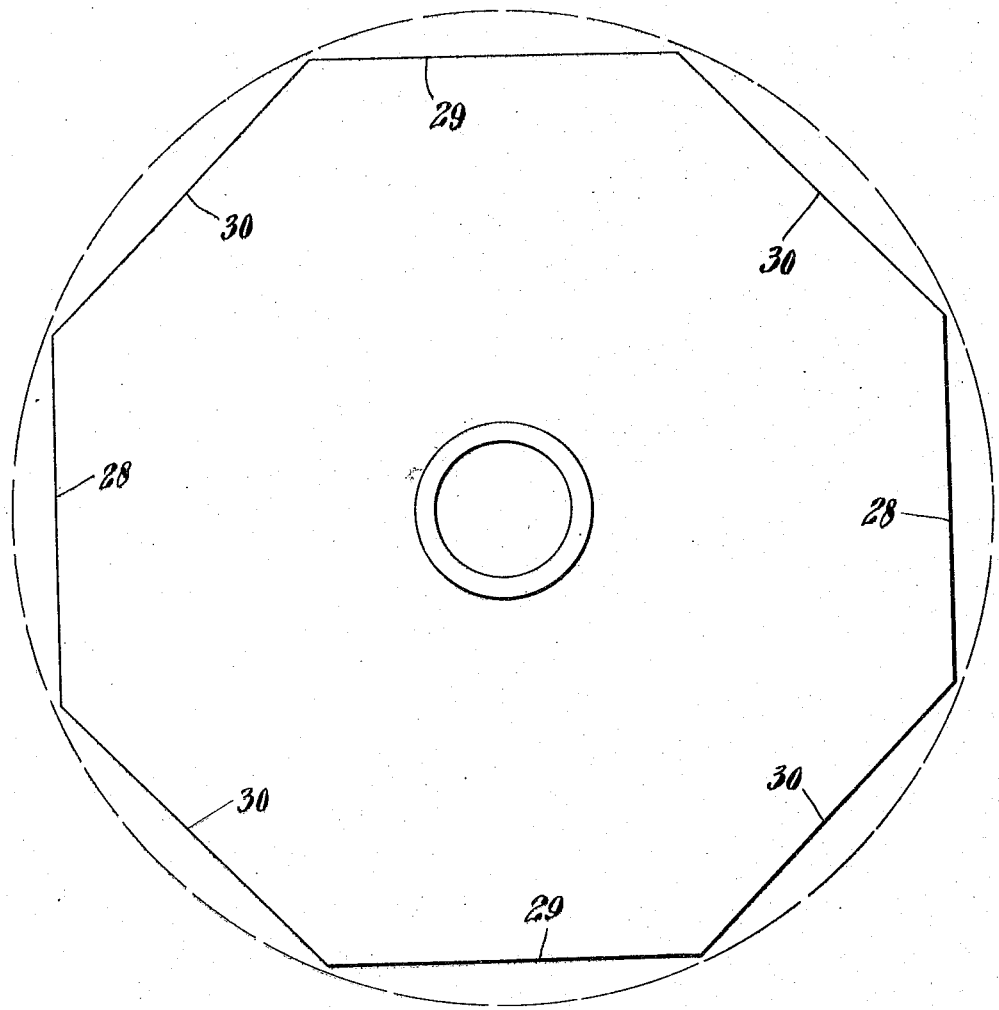

In the drawings: Figure 1 is a sectional side elevation of an apparatus embodying my invention; Fig. 2 is an enlarged sectional detail of the fly wheel mounting; Fig. 3 is a detail of the fly wheel mounting pin; Figs. 4 and 5 are plan views of the rotatable members at low and high velocity, respectively; Fig. 6 is an enlarged vertical cross section of the rotatable members and their mounting; Fig. 7 is a partial vertical cross section at right angles to that of Fig. 6, further illustrating the lower supporting means; Fig. 8 is a detail plan view of the top of the tube and its fastening; Fig. 9 is a detail perspective view of one of the separable sections of the tube; Fig. 10 is a partial section similar to Fig. 4, showing a modification of the tube; Fig. 11 is a detail plan view similar to Fig. 8, but further illustrating the modification shown in Fig. 10; and Fig. 12 is a detail perspective view similar to Fig. 9, showing one of the sections of the tube of Fig. 10.

The vessel 1 for containing milk elements to be operated upon is of wide and low formation providing an ample base, so that the vessel is readily secured in a substantial manner to a table or other supporting means. The wide and low formation of the vessel in addition to providing a firm foundation therefor, prevents the substance operated upon therein from becoming deep in proportion to its diameter. Keeping the depth of the substance shallow in proportion to its diameter is a very important feature in the satisfactory operation of my apparatus, and for that reason I make my vessel for containing a substance to be operated upon of a wide and low formation, namely, the diameter being greater than its depth. This is according to the method set forth and claimed in my co-pending applications, Serial No. 744,158, filed Jan. 25, 1913, Serial No. 829,982, filed April 6, 1914, and Serial No. 11,355, filed March 1, 1915.

The bracket 2 is mounted across the top of the vessel resting on the rim thereof at opposite sides and having at one side a flat shank 3 that enters a cleat 4 fixed on the side of the vessel so that this end of the bracket 2 is held firmly down on the rim of the vessel. At the other side the bracket has a channel 5 fitting over the rim of the vessel and has, projecting outwardly, upwardly opening hooks 6. An arm 7 extends along the outside of the vessel, and its upper end has laterally projecting lugs 8 that engage in the upwardly opening hooks 6. This arm 7 at its bottom has a part 9 coming sufficiently far below the bottom of the vessel 1 to pass under the table or other object 10 upon which the vessel is to be supported, and this terminal part 9 has a clamping screw 11 passing up through it to bear against the lower side of the top of the table or other object 10. With the shank end 3 of the bracket 2 fitting snugly under the cleat 4 and thus supporting and steadying this end of the bracket, and with the channel 5 fitting the rim of the vessel 1 snugly, it is thus possible to secure the bracket 2 firmly on the vessel 1 and at the same time secure the vessel firmly on the table or other object. The above clamping means is disclosed and claimed in my co-pending application, Serial No. 11,353, filed March 1, 1915.

Immediately above the part of the bracket 2 that has the channel 5 and hooks 6, the horizontal shaft 12 has a bearing 13, and over near the middle of the bracket, this shaft has another bearing 14. The solid shaft 15 is mounted vertically and extends down into the vessel having a bearing 16 in the middle of the bracket 2, and another bearing 17 at the top of an upwardly extending arm 18 which the bracket 2 has on the side of the shaft 15 opposite from the bearing 14. This bracket is disclosed and claimed in my copending application, Serial No. 104,071, filed June 16, 1916. A bevel pinion 19 is fixed on the solid shaft 15 and a bevel gear 20 is fixed on the inner end of the shaft 12 between the bearing 14 and the shaft 15 and meshes with the bevel pinion 19. The outer end of the shaft 12 outside the bearing 13 has a crank 21 fixed on it. The solid shaft 15 extends above the top of the bearing 17 and a fly wheel 22 is fixed on the shaft 15 to increase the steadiness of operation of the machine when turned manually by means of the crank 21. This fly wheel has a slot 23 in the lower end of its hub that fits down over a pin 24, passing transversely through the shaft 15 and having a middle recess 25 on its lower side. Thus the weight of the fly wheel holds this pin down in the opening through the shaft so that the end parts of the pin prevent endwise displacement of the pin while the pin causes the fly wheel 22 to turn with the shaft 15. This construction is best shown in Figs. 2 and 3.

Each of the impeller members 26 and 27 is composed of a square sheet of metal with its corners bent down or up, as the case may be, so that the complete impeller is octagonal with triangular sides 28 and 29, respectively. These members thus formed are inversely assembled with the triangular sides overlapping and leaving open sides 30. The parts are so proportioned that the members have their diameters and their upper and lower surfaces maximized and their vertical height and peripheral surfaces minimized, as hereinbefore alluded to. They are also made very little less in diameter than the interior of the vessel 1, so that their peripheries travel in close proximity with the inner walls of the comparatively wide and shallow vessel.

The upper impeller member 26 has a large central opening 31 around which is a depression 32 formed by pressing down the material of the sheet of which the impeller is formed. Fitting down in this depression is the lower end of the hollow shaft made up of the separable sections 33. This causes the hollow shaft to make a tight fit with the upper impeller member and yet be readily removable therefrom. The upper end of the hollow shaft has a yoke 34 with downwardly turned ends 35 fitting into lateral recesses 36 in the tops of the sections 33 of the tube. This yoke 34 has a hub 37 that fits closely around the solid shaft 15, and there is a set screw 38 through the hub against the shaft 15 to hold the yoke 34 tightly on the shaft to turn therewith and to hold this yoke down against the sections 33 of the tube.

The lower impeller member 27 has an opening in its center through which the shaft 15 projects downwardly and diametrically across its center it has a groove formed by pressing upwardly a bead 39, so that the groove opens downwardly and extends radially from each side of the opening through which the shaft 15 extends. The shaft 15 has a hole diametrically through it through which a pin 40 is passed, and when the lower impeller member 27 is brought down, this pin will fit up in the groove in the lower side of the impeller member 27 and be held against endwise displacement. Thus the pin 40 will hold the lower impeller member up and the impeller member will hold the pin in its proper supporting position. At the same time these parts are readily detached from each other.

It will be seen that with the pin 40 forming the lower support and the yoke 34 holding both impellers and both sections 33 of the tubular shaft down, the entire impeller and its hollow shaft are very securely held together for operation, but are very readily completely disassembled for cleaning; making all of the parts including the hollow shaft sections 33 entirely accessible for this purpose.

As before stated, the impeller periphery travels very close to the inner walls of the vessel; but against the inner walls are upright brakes 41 removably held down by suitable bearings on their upper ends against the bracket 2 close to where it bears on the opposite parts of the rim of the vessel. These brakes, together with the upwardly tapering formation of the vessel partially restrain the rotation of the composite substance when it is operated upon by the rotating impeller.

In the modification shown in Figs. 10, 11 and 12, the sections 33' and 33" of the hollow shaft are designed to be made of wood, being provided with tongues and grooves 42 and 43, respectively, as best seen in Figs. 11 and 12. These sections are, of course, considerably thicker than the metal sections 33 of the preceding example and the recesses 36' that receive the end parts 35 of the yoke 34 are simply cut in the outer surfaces of the upper parts of the sections 33' and 33". It will be understood that other parts may be made of wood instead of metal, and corresponding slight modifications made in accordance with such construction; as for instance, with the upper and lower impeller members 26 and 27 of wood, the depressions 32 and 39 would be cut in the wood. With the hollow shaft 28 thus provided, if the impeller is rotated it acts centrifugally and centripetally upon the liquid, making contact with the upper and lower surfaces of its upper and lower members, forcing the liquid radially outward between the two members and above them and below them while the periphery will present a substantially V-shaped formation. With the liquid thus impelled outwardly, areas of reduced pressure will be created in the central regions of the impeller, and air will be drawn down through the hollow shaft between the impellers. With the impellers thus formed and operated, the vibrations or undulations in the liquid around the periphery will be somewhat of a serpentine formation as indicated by the broken lines in Figs. 4 and 5, accordingly as the agitator is rotated slowly or rapidly.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal and centripetal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner. The milk elements should not have their temperature too low or too high, about 55° or 60° Fahrenheit being the preferred temperature. Such temperature is high enough to allow the operation to be performed quickly, and it is not so high as to cause the resulting butter granules to be too soft. With this method butter may be produced in from three to ten minutes. Perceptible accumulation of butter will practically all take place during the last 15 or 60 seconds of the operation. The butter will form in granules, and then the residue may be drawn off from the vessel and the granules salted by agitation and aeration of brine with the granules in the vessel. When the salting operation is completed, the butter granules may be removed from the brine in the vessel, or the brine may be withdrawn from the butter granules, and the granules then removed from the vessel, after which the granules are worked or pressed into consistency for use. The efficiency of operation is such that fully 90% of the butter fat of the cream is removed, and butter of purity of over 99% is obtainable, of firm texture and natural flavor.

Having fully described my invention, what I claim as new and desire to secure by Letters Patent is:

1. In a device of the class described, a vessel, an impeller having an air-tight opening, a driving shaft extending through the opening, a hollow shaft surrounding said driving shaft and composed of separable sections, means on the upper side of said impeller near said opening to hold the lower parts of said sections together, means for holding the upper parts of the sections together, means for holding the impeller up on the shaft against the sections of the hollow shaft, and means for rotating said driving shaft.

2. In a device of the class described, a vessel, an impeller having an air-inlet opening, a driving shaft extending through the opening, a hollow shaft surrounding said driving shaft and composed of separable sections, means on the upper side of said impeller near said opening to hold the lower parts of said sections together, means detachably mounted on the driving shaft and bearing down against the tops of the sections for holding the upper parts of the sections together, means on said driving shaft below the impeller, holding it up on the shaft against the sections of the hollow shaft, and means for rotating said driving shaft.

3. In a device of the class described, a vessel, an impeller having an air-inlet opening with a depression around it, a driving shaft extending through the opening, a hollow shaft surrounding said driving shaft and composed of separable sections, with the lower ends of these sections fitting in the depression, means detachably mounted on the driving shaft and bearing down against the tops of the sections for holding the upper parts of the sections together and down in the depression, means on said driving shaft below the impeller, holding it up on the shaft against the sections of the hollow shaft, and means for rotating said driving shaft.

4. In a device of the class described, a vessel, an impeller having an air-inlet opening, a driving shaft extending through the opening, a hollow shaft surrounding said driving shaft and composed of separable sections having tongues and grooves fitting together, means on the upper side of said impeller near said opening to hold the lower parts of said sections together, means for holding the upper parts of the sections together, means for holding the impeller up on the shaft against the sections of the hollow shaft, and means for rotating said driving shaft.

5. In a device of the class described, a vessel, an impeller comprising upper and lower members, and means spacing the members apart and leaving open sides to the impeller, whereby the impeller has comparatively broad plain upper and lower surfaces and comparatively shallow peripheral surfaces, the lower member having a small opening and the upper one having a larger opening with a depression around it, a driving shaft extending through the openings in the members, a hollow shaft composed of separable sections, with the lower ends of these sections fitting in the depression in the upper member, means detachably mounted on the driving shaft and bearing down against the tops of the sections, holding them together and down in the depressions, means on said driving shaft below the lower member holding the members up on the shaft against the sections of the hollow shaft, and means for rotating said driving shaft.

6. In a device of the class described, a vessel, an impeller comprising upper and lower members with comparatively broad plain upper and lower surfaces and comparatively shallow peripheral surfaces, one of said members being above the other, the lower one having a small opening and the upper one having a larger opening with a depression around it, a driving shaft extending through the openings in the members, a hollow shaft composed of separable sections, means on the upper member holding the lower ends of these sections together, means detachably mounted on the driving shaft and bearing down against the tops of the sections, holding them together and down on the upper member, means on said driving shaft below the lower member holding the members up on the shaft against the sections of the hollow shaft, and means for rotating said driving shaft.

7. In a device of the class described, a vessel, an impeller comprising upper and lower members each composed of a square sheet of metal with its corners bent down or up as the case may be and inversely assembled with the corners overlapping and spacing the members apart and leaving open sides to the impeller whereby the impeller is octagonal and so that its periphery will present a substantially V-shaped formation when the impeller is rotated, the lower one of said impellers having a small opening and the upper one a larger opening with a depression around it, a driving shaft extending through the openings in the members, a hollow shaft composed of separable sections, with the lower ends of these sections fitting in the depression in the upper member, means detachably mounted on the driving shaft and bearing down against the tops of the sections, holding them together and down in the depression, means on said driving shaft below the lower member holding the members up on the shaft against the sections of the hollow shaft, and means for rotating said driving shaft.

8. In a device of the class described, a vessel, an impeller having an air-inlet opening, a driving shaft extending through the opening, a hollow shaft surrounding said driving shaft and composed of separable sections, means on the upper side of said impeller near said opening to hold the lower parts of said sections together, a yoke with a hub fitting around said driving shaft, means to detachably secure said hub to the shaft, downwardly extended parts near the opposite ends of the yoke, the upper ends of said sections having recesses in which these parts fit, whereby the yoke holds the sections together around the shaft and holds said sections down on said impeller, means on said shaft holding the impeller and sections up against said yoke, and means for rotating said driving shaft.

9. In a device of the class described, a vessel, an impeller having an air-inlet opening, a driving shaft extending through the opening, a hollow shaft composed of separable sections, means on the impeller holding the lower ends of these sections together, means detachably mounted on the driving shaft and bearing down against the tops of the sections, holding them together and down on the impeller, the lower side of said impeller having transverse grooves substantially radial to the opening therein and on opposite sides thereof, said driving shaft having an opening through it to aline with these grooves, and a pin through said opening and fitting up in the grooves and held against endwise displacement by engagement of its ends with the ends of the grooves and holding the impeller up against said upper holding means, and means for rotating said driving shaft.

10. In a device of the class described, a vessel, an impeller having an air-inlet opening, a driving shaft extending through the opening, a hollow shaft composed of separable sections, means on the impeller holding the lower ends of these sections together, a yoke with a hub fitting around said driving shaft, means to detachably secure said hub to the shaft, downwardly extended parts on the opposite ends of the yoke, the upper ends of said sections having recesses in which these parts fit whereby the yoke holds the sections together around the shaft and holds said sections down in said depression, the lower side of said impeller having transverse grooves substantially radial to the opening therein and on opposite sides thereof, said driving shaft having an opening through it to aline with these grooves, and a pin through said opening and fitting up in the grooves and held against endwise displacement by engagement of its ends with the ends of the grooves and holding the impeller up against said yoke, and means for rotating said driving shaft.

11. In a device of the class described, a vessel, an impeller having an opening, a driving shaft extending through the opening, the lower side of said impeller having transverse grooves substantially radial to the opening therein and on opposite sides thereof, said driving shaft having an opening through it to aline with these grooves, and a pin through said opening and fitting up in the grooves and held against endwise displacement by engagement of its ends with the ends of the grooves and holding the impeller up against said upper holding means, and means for rotating said driving shaft.

12. In a device of the class described, a vessel, an impeller having an air-inlet opening, a hollow shaft composed of separable sections, means to detachably hold said sections together with the hollow shaft leading to said opening, and means for rotating said shaft and impeller together.

13. In a device of the class described, a vessel, an impeller having an air-inlet opening, a hollow shaft composed of separable sections having tongues and grooves fitting together, means to detachably hold said sections together, with the hollow shaft leading to said opening, and means for rotating said shaft and impeller together.

ALPHEUS FAY.

Witnesses:
 CLARENCE PERDEW,
 IRENE PARKER.

Copies of this patent may be obtained for five cents each, by addressing the "Commissioner of Patents, Washington, D. C."

It is hereby certified that in Letters Patent No. 1,191,883, granted July 18, 1916, upon the application of Alpheus Fay, of Louisville, Kentucky, for an improvement in "Apparatus for Operating Upon Composite Substances," errors appear in the printed specification requiring correction as follows: Page 1, line 52, after the period insert the sentence *It is disclosed and claimed in my copending application Serial No. 11352, filed March 1, 1915;* page 3, line 102, claim 1, for the compound word "air-tight" read *air-inlet;* and that the said Letters Patent should be read with these corrections therein that the same may conform to the record of the case in the Patent Office.

Signed and sealed this 10th day of October, A. D., 1916.

[SEAL.]

R. F. WHITEHEAD,
*Acting Commissioner of Patents.*